J. W. HAMILTON.
AUTOMOBILE HEADLIGHT.
APPLICATION FILED NOV. 20, 1919.
1,362,530.
Patented Dec. 14, 1920.
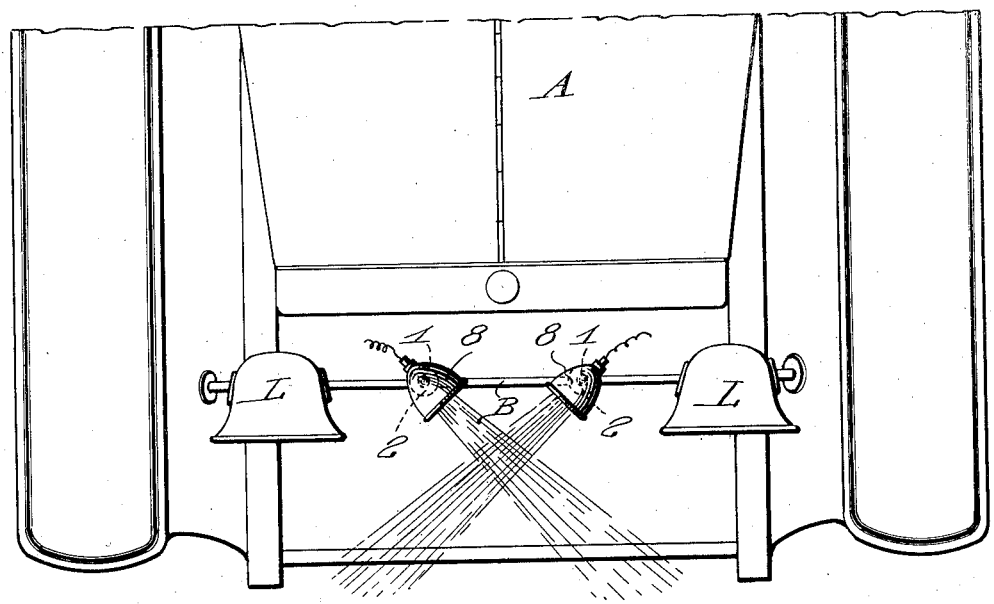
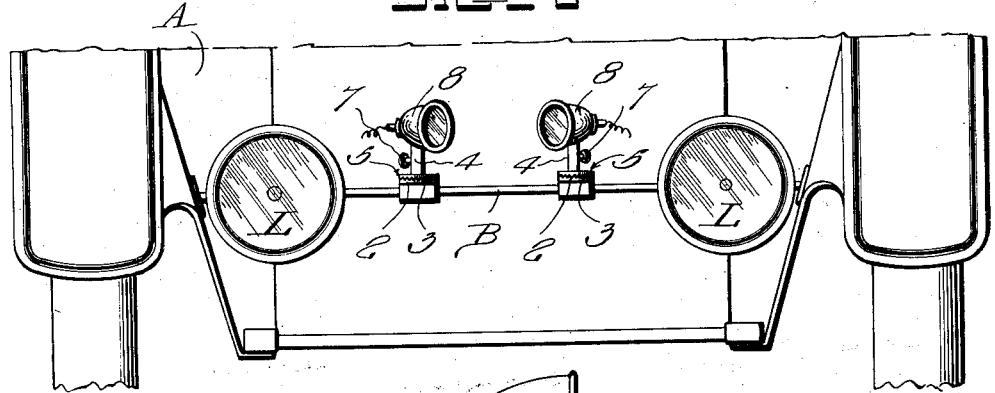
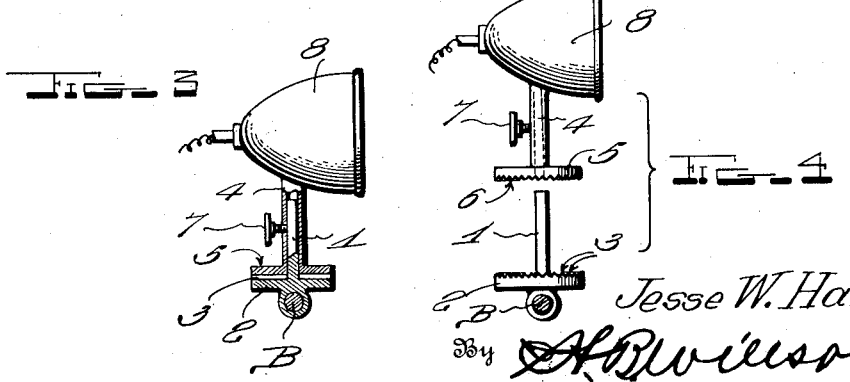
Inventor
Jesse W. Hamilton
By H. B. Willson & Co.
Attorneys

UNITED STATES PATENT OFFICE.

JESSE W. HAMILTON, OF OAKLAND, CALIFORNIA.

AUTOMOBILE-HEADLIGHT.

1,362,530.

Specification of Letters Patent.    Patented Dec. 14, 1920.

Application filed November 20, 1919. Serial No. 339,371.

*To all whom it may concern:*

Be it known that I, JESSE W. HAMILTON, a citizen of the United States, residing at Oakland, in the county of Alameda and State of California, have invented certain new and useful Improvements in Automobile-Headlights; and I do declare the following to be a full, clear, and exact description of the invention, such as will enable others skilled in the art to which it appertains to make and use the same.

This invention relates to improvements in automobile head-lights.

The principal object of the invention is to provide a pair of head-lights, auxiliary to the usual or main head-lights, which are so mounted on the vehicle that the rays of light therefrom will illuminate either side of the road in front of the vehicle.

Another object of the invention is to provide improved auxiliary lights which are controlled independent of the main head-lights, and will effectively illuminate the path of travel of the car, the lights being adjustable to project their rays at any desired angle.

Other objects and advantages of the invention will become apparent during the course of the following description.

In the accompanying drawings forming a part of this specification and in which like numerals are employed to designate like parts throughout the same, Figure 1 is a top plan view of a portion of an automobile equipped with my invention.

Fig. 2 is an end elevation of Fig. 1.

Fig. 3 is a side elevation, partly in section, of a lamp constructed in accordance with my invention.

Fig. 4 is a view of the lamp construction showing the parts disassembled.

In the drawings, wherein for the purpose of illustration is shown a preferred embodiment of my invention, the letter A indicates a portion of an automobile which includes the usual rigidly attached head-lights L, and a supporting bar B which is connected to the lights L.

My invention resides in the attachment of a pair of auxiliary lights or lamps to a suitable support, adjacent the usual head-lights, the former being adjustable on this support and which serve to illuminate the sides of the road over which the vehicle is traveling, the attachment being especially advantageous because it illuminates curves and ruts which the ordinary lights do not show up.

In carrying out my invention I employ a pair of spaced vertically disposed spindles 1 which may be attached to any suitable part of the vehicle. However, I have shown them as being rigidly attached to the cross bar B. Each spindle is provided with a disk 2 adjacent its lower end, the upper face of which is provided with radial teeth 3. Rotatably and slidably mounted on the spindles 1 are socket members 4, each of which is provided with a similar disk 5, also having radial teeth 6 on its under face. These disks are adapted to normally mesh tightly with one another and prevent rotation of the socket member on the spindle. In addition to this locking means I provide set screws 7 which are threaded through the sockets 4 and engage the spindles 1 thereby preventing relative movement between the socket and spindle when the screws are tightened. Each socket is also provided at its top with a lamp or light 8, secured thereto in any suitable manner.

The lights 8 are to be operated independent of the main lights L and they may be operated separately or together by a switch on the dash board within convenient reach of the operator. These lights are to be preferably placed in proximity to the main lights and the one adjacent the right hand side of the machine is adapted to be adjusted or angled to project its rays diagonally toward the left hand side of the machine, and the one on the opposite side is adapted to be adjusted to an angle whereby its rays will be projected diagonally toward the right hand side of the machine. The reason for this particular way of focusing or angling the lights is to minimize the glare of the lights in the eyes of the driver of an auto approaching in an opposite direction, while at the same time effectively illuminating both sides of the road. Of course, it is optional whether or not the main lights L are used or not when these lights are used. As before stated, either one or both of the lights may be used, together or separately. However, I have found it convenient to have both of the lights on, so that the operator can judge how close to run to other vehicles passing him and, as the lights illuminate both sides of the road, there is little liability of running off of the road or striking obstacles alongside of the path of travel.

The angle of the lights may be readily changed from time to time to suit the operator or the particular circumstances.

The manner of assembling and operating the device is thought to be obvious from the foregoing description and further description thereof is deemed unnecessary.

It is to be understood that the form of my invention herein shown and described is to be taken as a preferred form of the same, and that various changes in the shape, size, and arrangement of parts may be resorted to without departing from the spirit of the invention or the scope of the subjoined claims.

Having thus described my invention I claim:

1. The combination with the usual pair of automobile headlights and a horizontal connecting rod extending between the same, of a pair of relatively fixed auxiliary headlights mounted for rotatable adjustment on vertical axes on said rod, said auxiliary headlights being positioned on opposite sides of the longitudinal center of the connecting rod and each turned angularly with respect to the direction of travel of the automobile, whereby the rays from the two auxiliary headlights will be directed to cross one another, with the left-hand light illuminating the right-hand side of the path of travel while the remaining light illuminates the opposite side of the path of travel.

2. The combination with a pair of automobile headlights and a supporting rod extending between said headlights, of a pair of spaced spindles rigidly mounted on said supporting rod and rising upwardly therefrom, a disk carried by each spindle adjacent its lower end, the upper face of each disk being provided with radial teeth, a socket rotatable on each spindle, a disk on the lower end of each socket, each disk being provided on its lower face with radial teeth which are adapted to mesh with the teeth on the first named disks, a set screw threaded through each socket and adapted to engage the spindle to prevent rotation of the sockets, and a lamp secured to the upper end of each socket, substantially as described and for the purpose set forth.

In testimony whereof I have hereunto set my hand.

JESSE W. HAMILTON.